(12) United States Patent
Bornemann et al.

(10) Patent No.: US 9,162,314 B2
(45) Date of Patent: Oct. 20, 2015

(54) PLASMA CUTTER WITH DISCONNECTABLE TORCH AND WORK ASSEMBLIES

(71) Applicant: Illinois Tool Works Inc., Glenview, IL (US)

(72) Inventors: Brian James Bornemann, Appleton, WI (US); Nathan Gerald Leiteritz, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/082,792

(22) Filed: Nov. 18, 2013

(65) Prior Publication Data

US 2014/0069894 A1    Mar. 13, 2014

Related U.S. Application Data

(63) Continuation of application No. 12/425,218, filed on Apr. 16, 2009, now Pat. No. 8,586,892.

(60) Provisional application No. 61/052,045, filed on May 9, 2008.

(51) Int. Cl.
| | |
|---|---|
| *B23K 10/00* | (2006.01) |
| *B23K 9/013* | (2006.01) |
| *B23K 9/32* | (2006.01) |
| *B23P 19/00* | (2006.01) |
| *H05H 1/34* | (2006.01) |

(52) U.S. Cl.
CPC ............... *B23K 10/00* (2013.01); *B23K 9/013* (2013.01); *B23K 9/323* (2013.01); *B23P 19/00* (2013.01); *H05H 1/34* (2013.01); *Y10T 29/49083* (2015.01); *Y10T 29/49826* (2015.01)

(58) Field of Classification Search
CPC .............. H05H 1/26; H05H 1/34; H05H 1/36
USPC ............. 219/121.39, 121.44, 121.48, 121.54, 219/121.45, 137.31, 75
See application file for complete search history.

(56) References Cited

U.S. PATENT DOCUMENTS 5,357,076 A * 10/1994 Blankenship ............ 219/121.54
5,378,870 A    1/1995 Krupnicki
6,472,631 B1   10/2002 Eickhoff (Continued)

OTHER PUBLICATIONS

OTC Owner's Manual No. P6987-2 (Daihan Corporation), 4 pgs.

*Primary Examiner* — Mark Paschall
(74) *Attorney, Agent, or Firm* — Fletcher Yoder P.C.

(57) ABSTRACT

Systems and methods relating to securing a torch assembly and a work lead assembly to a plasma cutting power supply are provided. The present disclosure relates to a system and method that allows the torch assembly and the work lead assembly to be readily replaced by the user since the power supply unit need not be opened or disassembled for removal. The present disclosure provides methods and systems for removably securing both the torch assembly and the work lead assembly to the plasma cutting power supply. In one embodiment, the torch assembly and the work lead assembly may be communicatively coupled to the plasma cutting power supply unit via a single cable and a single connector. The connection between the first connector and the first port may be of the quick disconnectable type. The connection between the second connector and the second port may be of the twist lock type, such as a dinse style connector.

18 Claims, 7 Drawing Sheets

(56) References Cited

U.S. PATENT DOCUMENTS

| | | |
|---|---|---|
| 6,713,711 B2 | 3/2004 | Conway |
| 6,905,360 B2 | 6/2005 | Berger |
| 7,105,766 B2 | 9/2006 | Samler |
| 7,176,404 B2 | 2/2007 | Herres |
| 7,294,809 B2 | 11/2007 | Giese |
| 7,411,149 B2 | 8/2008 | Schneider |
| 2008/0264918 A1 | 10/2008 | Helf et al. |
| 2009/0215302 A1 | 8/2009 | Roberts |

* cited by examiner

PLASMA CUTTER WITH DISCONNECTABLE TORCH AND WORK ASSEMBLIES

CROSS REFERENCE TO RELATED APPLICATIONS

This application is a Continuation Application of U.S. patent application Ser. No. 12/425,218, entitled "Plasma Cutter with Disconnectable Torch and Work Assemblies", filed Apr. 16, 2009, which is a Non-Provisional Application of U.S. Provisional Patent Application No. 61/052,045, entitled "Plasma Cutter with Disconnectable Torch and Work Cables", filed May 9, 2008, both of which are herein incorporated by reference for all purposes.

BACKGROUND

The present disclosure relates generally to plasma cutting systems, and more particularly, to methods and systems for removably connecting a plasma cutting torch and a work lead to a plasma cutting power supply unit.

A plasma cutting system harnesses the energy in plasma (e.g., high temperature ionized gas) to cut metal or other electrically conductive material. A plasma arc must be struck between components in the plasma cutting torch and the work piece. This process requires a voltage output between the cutting torch and the workpiece. Accordingly, a power supply unit coupled to a torch and a work lead is an integral part of any plasma cutting system. Typical plasma cutting systems are configured with the torch and work lead cables permanently attached to the power supply unit. However, when not in use, the user must manage lengthy cables during transport or storage. Since one end of each cable of a traditional plasma cutting system is permanently attached to the power supply unit, coiling is difficult because only one end of each cable can rotate freely.

Another difficulty associated with permanently connected cables is that the permanent attachment prohibits the storage of the cables in alternative locations. They must remain with the power supply. Further, the fixed ends of the cables generally extend outward, which leads to an awkward and inefficient storage shape.

BRIEF DESCRIPTION

The present disclosure is directed to systems and methods relating to removably securing a torch assembly and a work lead assembly to a plasma cutting power supply. The present disclosure allows the torch assembly and the work lead assembly to be easily removed and/or attached by the user since the power supply unit need not be opened or disassembled for removal. In particular, the present disclosure provides methods and systems for removably securing both the torch assembly and the work lead assembly to the plasma cutting power supply. In one embodiment, the torch assembly and the work lead assembly may be communicatively coupled to the plasma cutting power supply unit via a single cable and a single connector. In one embodiment, the connection or connections between the cables and the power supply may be of the quick connect type. In another embodiment, a first connection between a first cable and the power supply may be of a twist lock type, (e.g. a dinse style connector), and a second connection between a second cable and the power supply may be of a quick disconnect type.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
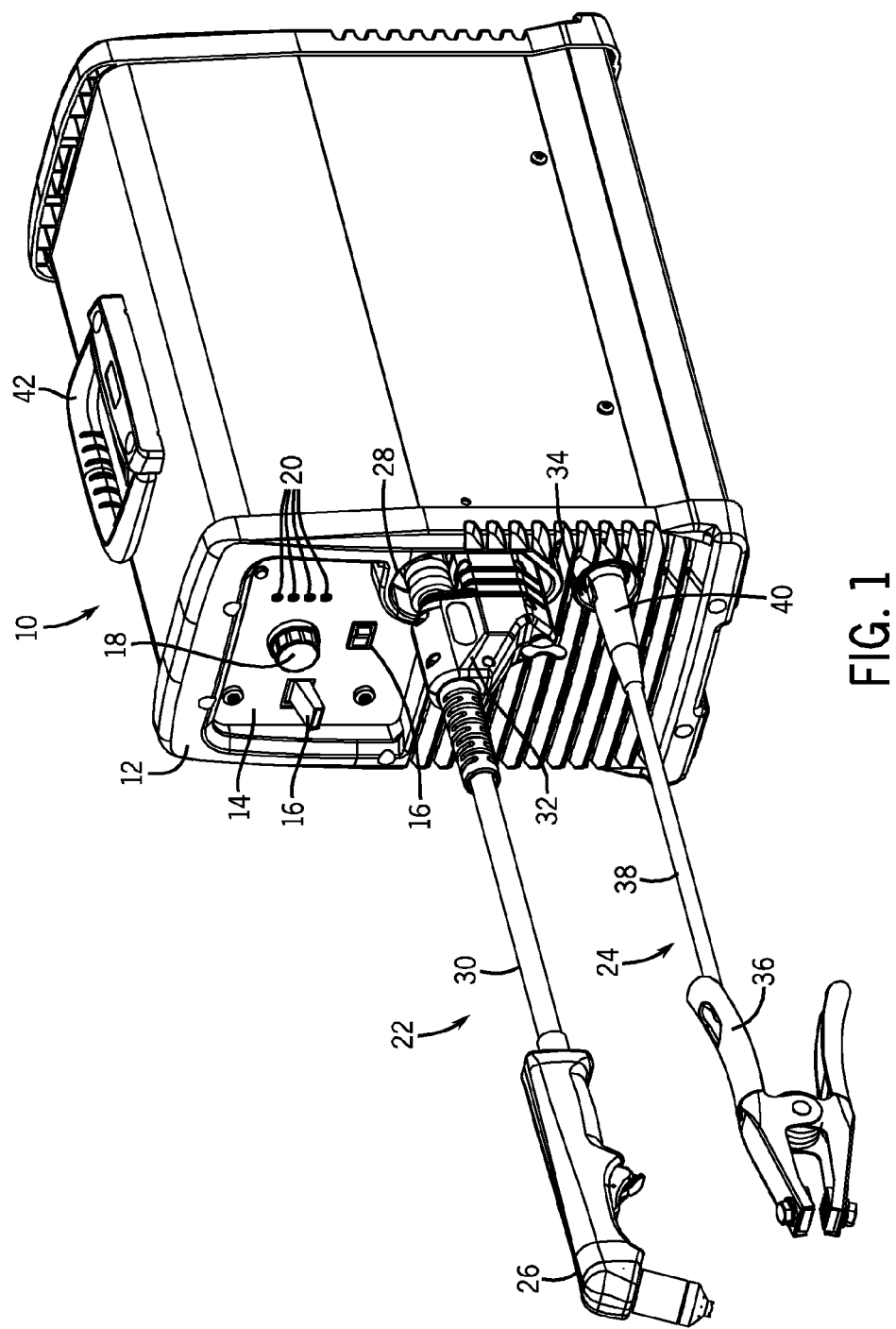
FIG. 1 illustrates an exemplary plasma cutting power supply with a torch assembly and a work lead assembly which are each removably attached to the power supply unit in accordance with aspects of the present disclosure.

FIG. 1 illustrates an exemplary plasma cutting power supply 10, which functions to power and control a cutting operation in accordance with aspects of the present disclosure. An interface panel 12 on the front side of the power supply unit 10 in the illustrated embodiment contains a control panel 14, through which a user may control the supply of materials, such as power, gas flow, and so forth for a cutting operation, via switches 16, knobs 18, and so forth. Display 20 on the control panel 14 provide the user with information regarding operation of the power supply unit 10. A torch assembly 22 and a work lead assembly 24 communicatively couple with the power supply unit 10. The torch assembly 22 includes a cutting torch 26 that is communicatively coupled to a first port 28 in the power supply unit 10 via a first cable 30 and a first connector 32 of the torch assembly 22. A second port 34 facilitates coupling of the work lead assembly 24 with the power supply unit 10. Specifically, the second port 34 allows a work lead 36 to be communicatively coupled to the power supply 10 via a second cable 38 and a second connector 40. Portability of the unit 10 may be facilitated by a handle 42, which enables the user to easily grasp the power supply unit 10 and move the power supply unit 10 to the location of a workpiece. In some embodiments, the power supply unit 10 may be communicatively coupled to additional system components, such as a wall power outlet, a battery, engine-driven power sources, and so forth.

It is now recognized that there exists a need for techniques that can offer improvements in storage and transportation efficiency of plasma cutting power supply units 10, thereby eliminating some of the technical difficulties associated with the storage and use of such units. Accordingly, in the embodiment illustrated in FIG. 1, the connectors 32, 40 are readily attachable and/or detachable from the power supply unit 10 by a user. In other words, both of the connectors 32, 40 are removably attached to the first and second ports 28, 34. This is in contrast to traditional systems, which typically include a permanent attachment of the torch assembly 22 and/or work lead assembly 24 with the power supply unit 10.

In the present disclosure, use of the term "permanently attached" may indicate that features of a device are coupled together (e.g., during manufacturing) such that separate portions of the device must be disassembled and/or broken to disconnect the coupled components. Additionally, in the present disclosure, the term "removably attached" or "readily detachable" may indicate that features of a device are coupled together such that an ordinary user need not disassemble other components of the device and/or break the device to uncouple the features. For example, in accordance with present embodiments, a user may decouple the torch assembly 22 from the power supply unit 10 without opening the power supply unit 10 or exerting extreme force. Further, in some embodiments, the torch assembly 22 and/or work lead assembly 24 may be detached from the power supply unit 10 without disassembly of the power supply unit 10 and without the use of tools.

The ability to removably attach both the torch assembly 22 and the work lead assembly 24 from the power supply unit 10 offers distinct benefits. For example, the torch assembly 22 and the work lead assembly 24 may be easily coiled and stored separately from the power supply unit 10. Further, the torch assembly 22 and the work lead assembly 24 may be easily replaced by the user since the power supply unit need not be opened or disassembled for disconnection. For instance, the user may change the torch assembly 22 and the work lead assembly 24 when a different cable length would better suit the cutting operation.

Figure 2:
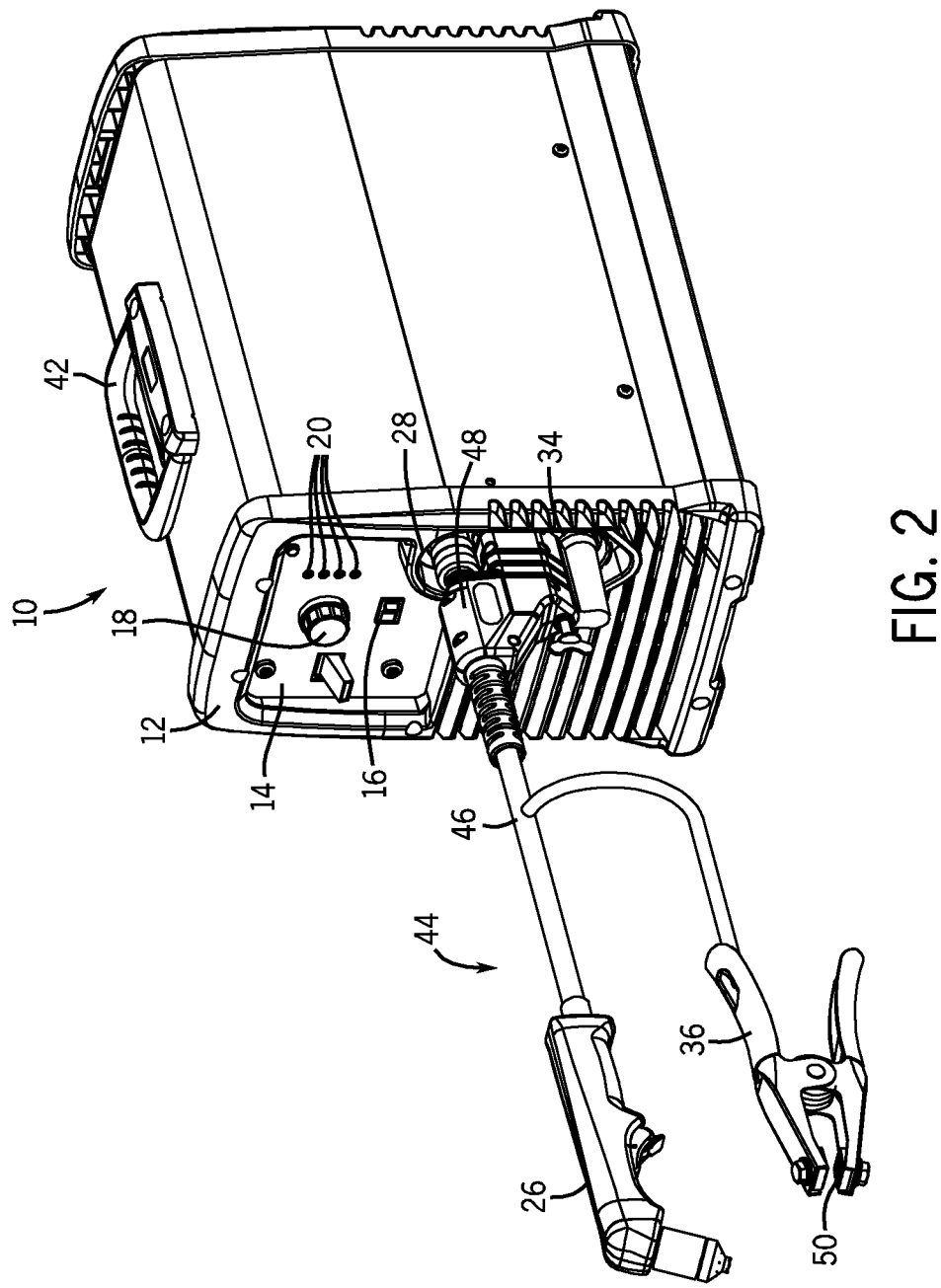
FIG. 2 illustrates an exemplary plasma cutting power supply with a combined torch and work lead assembly in accordance with aspects of the present disclosure.

FIG. 2 illustrates a single combined torch and work lead assembly 44 communicatively coupled to the plasma cutting power supply unit 10. In this embodiment, the torch 26 and the work lead 36 may be communicatively coupled to the power supply unit 10 via a single cable 46 that branches off into two divisions at an extending end, wherein the extending end is the end of the cable 46 that connects to the torch 26 and the work lead 36. At the end of the single cable 46 opposite the extending end, the single cable 46 couples with a single connector 48. The single cable 46 and the single connector 48 may provide gas, electricity, and a functional electric return path. The cutting torch 26 and the work lead 36 may be utilized to perform cutting operations. In the illustrated embodiment, the work lead 36 includes a clamp 50. During operation, the clamp 50 connects to a workpiece to close the circuit between the torch 26, the work piece, and the supply unit 10, and to ensure proper current flow.

Figure 3:
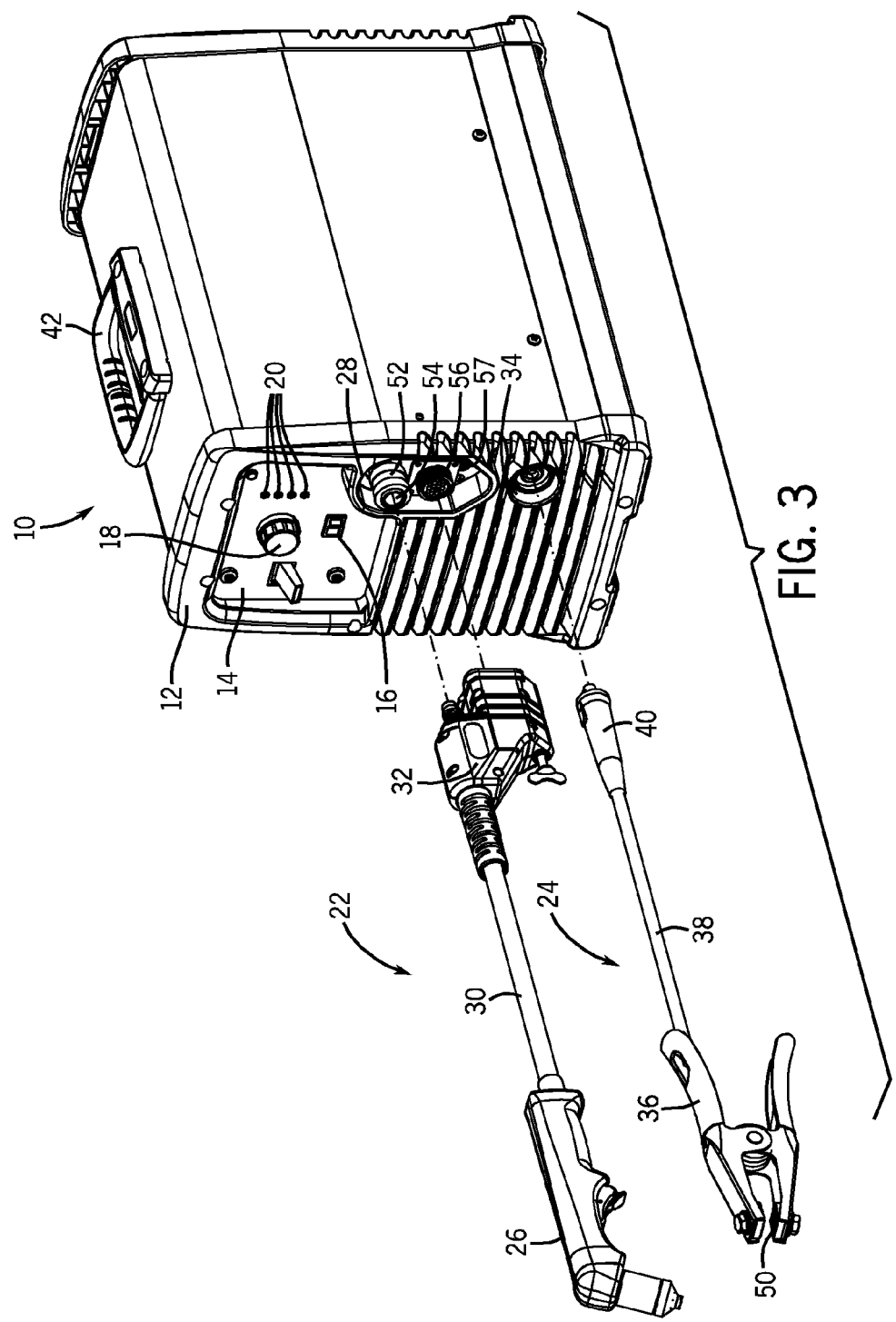
FIG. 3 illustrates an exemplary plasma cutting power supply with a torch assembly and a work lead assembly unattached from the power supply unit in accordance with aspects of the present disclosure.

FIG. 3 illustrates the exemplary plasma cutting power supply 10 of FIG. 1, wherein the torch assembly 22 and the work lead assembly 24 are unattached from the power supply 10. In one embodiment, the torch 26 may be permanently attached to the first cable 30, which may permanently attach to the first connector 32. The first connector 32 may then removably attach to the first port 28 via a first secondary port 52 with an aperture 54, a second secondary port 56 and a third secondary port 57. In the illustrated embodiment, the first secondary port 52 may provide gas, such as air, nitrogen, and so forth, for plasma generation to the torch assembly 22. The second secondary port 56 may provide the electrical connections required by the torch 26, such as cutting power, pilot power, low voltage connections (e.g. cup sensor, trigger), and so forth. The third secondary port 57 may provide a securing mechanism. In one embodiment, the connection between the first connector 32 and the first port 28 may be of the quick disconnectable type. It should be noted that in other embodiments, the various components of the torch assembly 22 may be removably attached with one another.

Much like the components of the torch assembly 22, the components of the work lead assembly 24 may be permanently coupled together and/or removably attached. For example, in the illustrated embodiment, the work lead 36 may be permanently attached to the second cable 38, which may permanently attach to the second connector 40. The second connector 40 may then removably attach to the second port 34 to communicatively couple the work lead assembly 24 to the power supply unit 10. In one embodiment, the connection between the second connector 40 and the second port 34 may be of the twist lock type. In this embodiment, the second connector 40 may be a dinse style connector.

Figure 4:
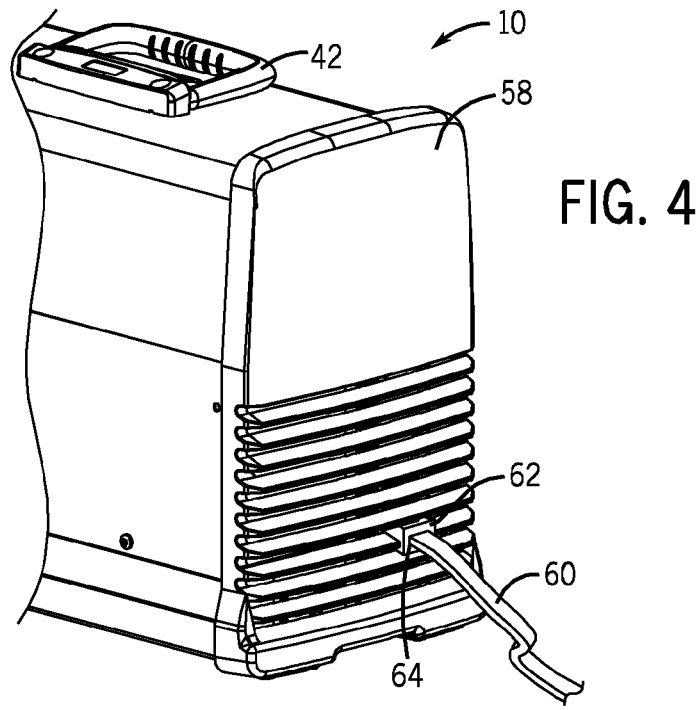
FIG. 4 illustrates an exemplary plasma cutting power supply with a primary power supply cable removably attached to the power supply unit in accordance with aspects of the present disclosure.

FIG. 4 illustrates the back panel 58 of the plasma cutting power supply unit 10 in accordance with aspects of the present disclosure. In the illustrated embodiment, a primary power supply cable 60 that connects the power supply unit 10 to the primary source of power is removably attached to a port 62 on the back panel 58 of the power supply unit 10 through a connector 64. In this embodiment, the power supply unit 10 may be compactly stored since the power supply cable 60 may be stored separate from the unit 10. Additionally, the removably attached cable 60 may be easily detached and replaced by the user. In other embodiments, the power supply cable 60 may be permanently attached to the power supply unit 10.

Figure 5:
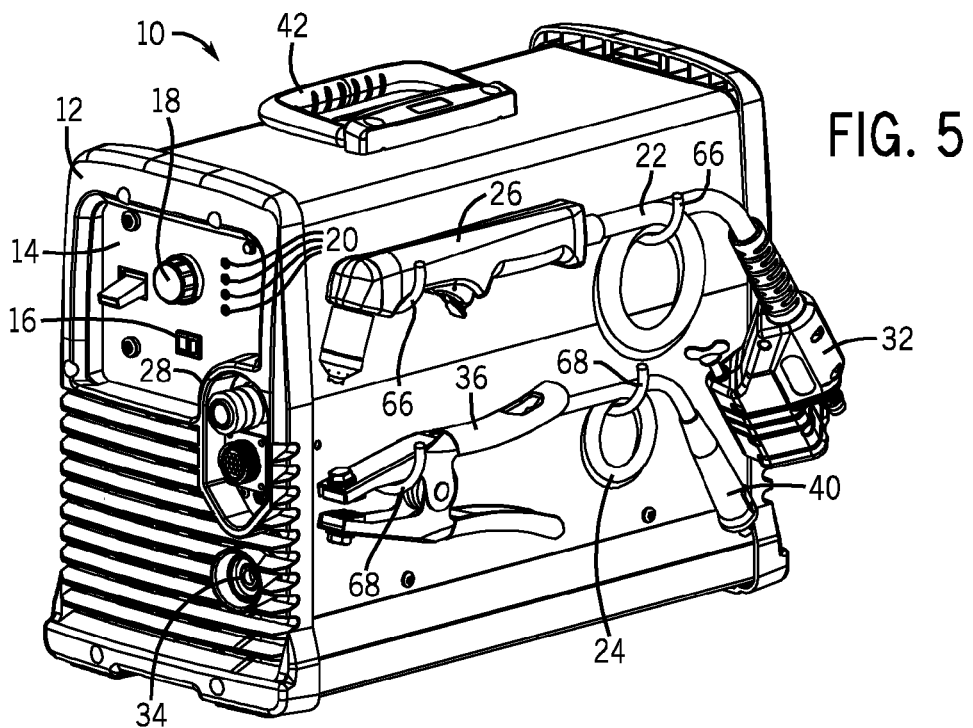
FIG. 5 illustrates an exemplary plasma cutting power supply with a coiled torch assembly and a coiled work lead assembly hanging on a rack on the power supply unit in accordance with aspects of the present disclosure.

FIG. 5 illustrates a plasma cutting power supply with both the torch assembly 22 and the work lead assembly 24 coiled and hanging on a racks 66, 68 that are permanently secured or removably attached to a side of the power supply unit 10 in accordance with aspects of the present disclosure. In this embodiment, the torch assembly 22 and the work lead assembly 24 may be stored in the same location as the power supply unit 10. In further embodiments, the racks 66, 68 may be removably secured so the user may remove the racks 66, 68 when storage space for multiple power supply units is limited. The racks 66, 68 may contain one or more posts for storing one or more cables. In one embodiment, a single post may be configured to hold more than one cable.

Figure 6:
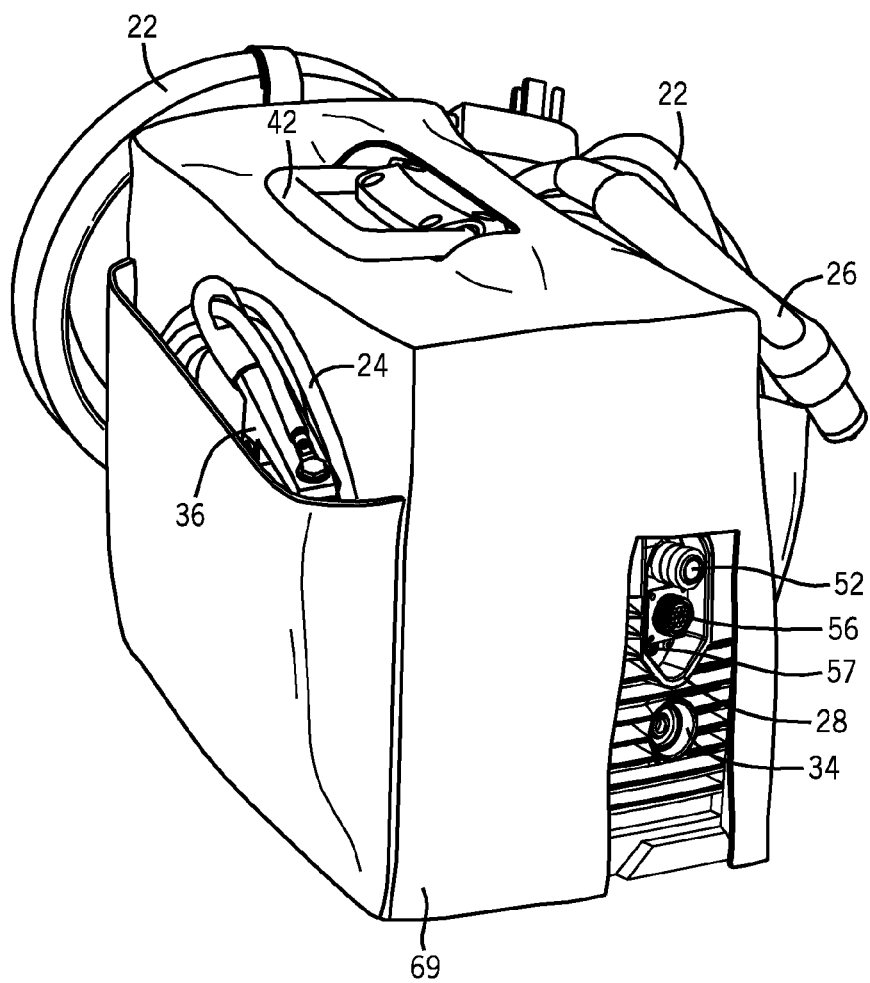
FIG. 6 illustrates an exemplary plasma cutting power supply with a coiled torch assembly and a coiled work lead assembly secured in a power supply unit cover in accordance with aspects of the present disclosure.

FIG. 6 illustrates a plasma cutting power supply 10 with the torch assembly 22 and the work lead assembly 24 coiled and secured in a power supply unit cover 69 in accordance with aspects of the present disclosure. In this embodiment, the cover 69 may encase the power supply unit 10 and hold the torch assembly 22 and the work lead assembly 24. In other embodiments, the cover 69 may exclusively hold either the torch assembly 22 or the work lead assembly 24. Additionally, in other embodiments, the cover 69 may hold the torch assembly 22 and the work lead assembly 24 in a single pocket. This embodiment may facilitate convenient storage of the power supply unit 10, the torch assembly 22, and the work lead assembly 24 when the user would like to store the power supply unit 10 in the location of the weld for future use. Additionally, this embodiment provides a compact way of transporting and storing the power supply unit 10 when the user would like to store the unit 10 in a location distance from the location of the cut.

Figure 7:
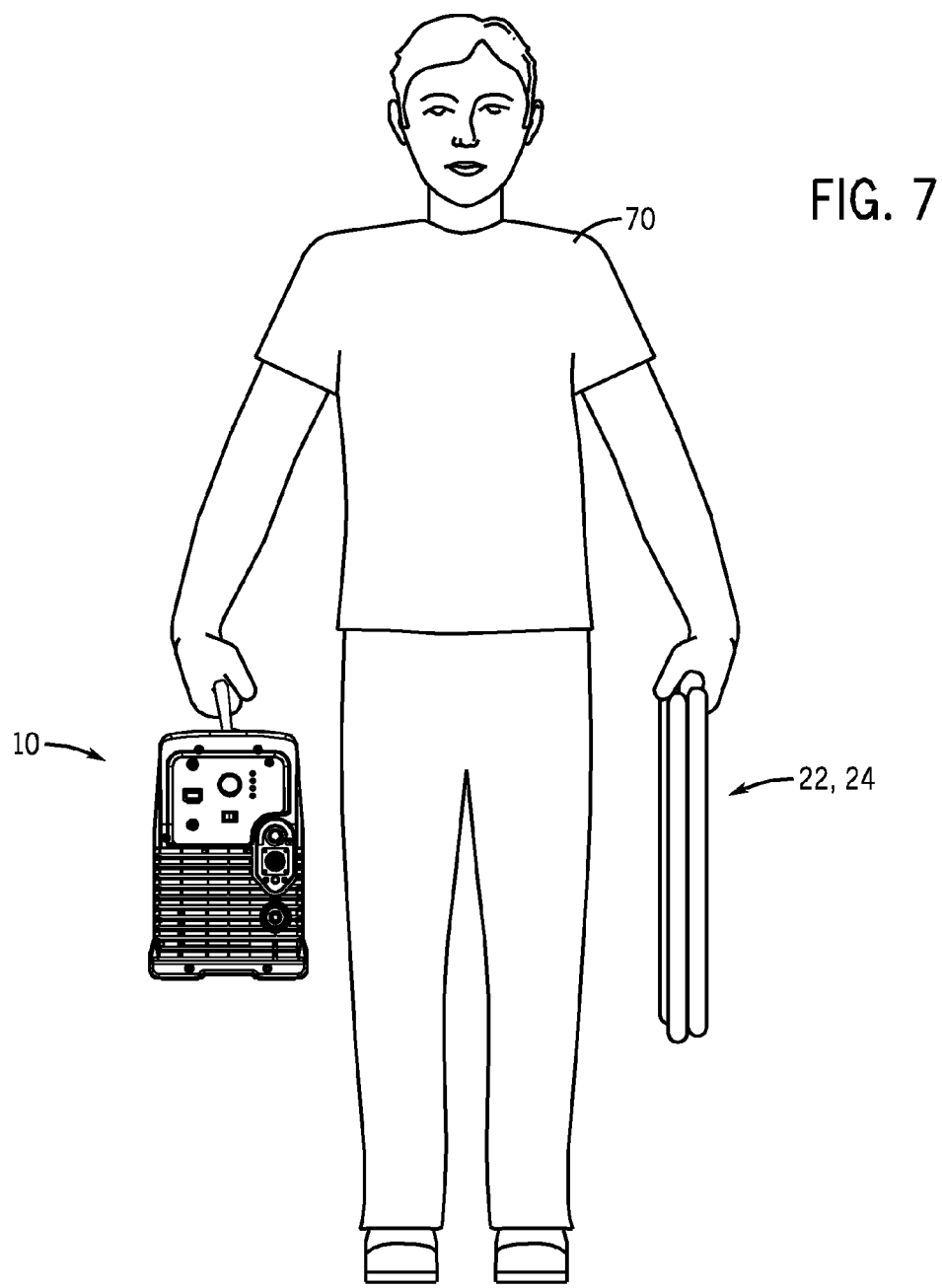
FIG. 7 illustrates a user carrying a balanced load that includes a power supply unit, a coiled torch assembly and a coiled work lead assembly in accordance with aspects of the present disclosure.

FIG. 7 illustrates a user 70 carrying a balanced load that includes the power supply unit 10, the coiled torch assembly 22 and the coiled work lead assembly 24 in accordance with aspects of the present disclosure. In the illustrated embodiment, the user 70 may carry the power supply unit 10 in one hand while carrying the torch assembly 22 and the work lead assembly 24 in the other hand to balance the load. Since this embodiment facilitates transport of the power supply unit 10 when the user 70 wishes to store or move the unit 10, it provides an advantage over typical systems that require the user 70 to carry the power supply unit 10, the torch assembly 22, and the work lead assembly 24 in one hand.

Figure 8:
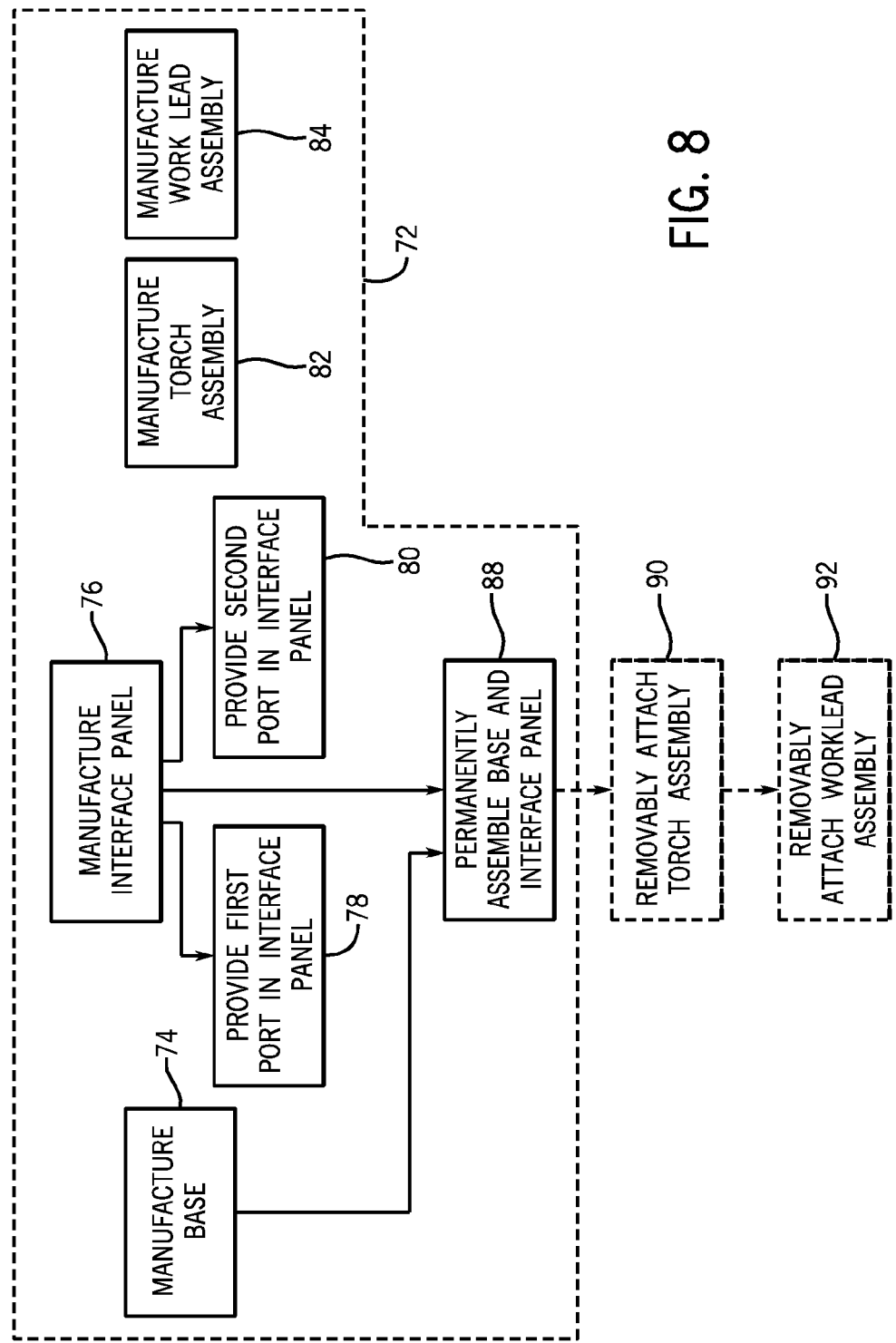
FIG. 8 illustrates an exemplary method of manufacturing the plasma cutting power supply system in accordance with aspects of the present disclosure.

FIG. 8 illustrates an exemplary method of manufacturing the plasma cutting power supply system 10 in accordance with aspects of the present disclosure. A manufacturing block 72 represents the manufacturing stage of the components of the plasma cutting system 10. A power supply unit 10 base is manufactured, as represented by block 74. Additionally, an interface panel 12 is manufactured, as represented by block 76. Subsequently, a first port 28 is provided in the interface panel 12, as represented by block 78, and a second port 34 is provided in the interface panel 12, as represented by block 80. A torch lead assembly 22 and a work lead assembly 24 are manufactured, as represented by blocks 82 and 84. An assembly stage during which the manufactured components may be connected follows the manufacturing stage 72. First, the base and the interface panel 12 are permanently attached, as represented by block 88. Subsequently, the torch assembly 22 and the work lead assembly 24 may be removably attached to the power supply unit 10 if desired, as represented by blocks 90 and 92.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A plasma cutting system comprising:
a plasma cutting power supply comprising a work lead port; and
a work lead assembly comprising:
a work lead;
a quick disconnect work lead connector configured to be removably inserted into the work lead port of the plasma cutting power supply, wherein the quick disconnect work lead connector comprises a dinse style connector or a twist lock style connector and is configured to be removably attached to and removably detached from the work lead port without the use of tools; and
a work lead cable coupling the work lead with the quick disconnect work lead connector.

2. The system of claim 1, comprising a torch assembly comprising:
a torch;
a torch connector configured to removably couple with a gas port of the plasma cutting power supply and an electrical port of the plasma cutting power supply; and
a torch cable coupling the torch with the torch connector.

3. The system of claim 2, wherein the torch connector comprises a quick disconnect system.

4. The system of claim 1, comprising a power supply cable, wherein the plasma cutting power supply comprises a power supply port, and the power supply cable is configured to removably couple with the power supply port of the plasma cutting power supply.

5. The system of claim 1, wherein the quick disconnect work lead connector comprises the dinse style connector.

6. The system of claim 1, wherein the quick disconnect work lead connector comprises the twist lock style connector.

7. A plasma cutting system comprising:
a plasma cutting power supply having an interface panel comprising a gas port and a separate electrical port offset from each other on the interface panel;
a torch assembly comprising:
a torch;
a torch connector comprising a gas port connector configured to removably couple with the gas port of the plasma cutting power supply and a separate electrical port connector configured to removably couple with the electrical port of the plasma cutting power supply; and
a torch cable coupling the torch with the torch connector; and
a work lead assembly comprising:
a work lead;
a quick disconnect work lead connector comprising a dinse style connector or a twist lock style connector, wherein the quick disconnect work lead connector is configured to removably couple with a work lead port of the plasma cutting power supply; and
a work lead cable coupling the work lead with the work lead connector.

8. The system of claim 7, wherein the quick disconnect work lead connector comprises a dinse style connector.

9. The system of claim 7, wherein the quick disconnect work lead connector comprises a twist lock style connector.

10. The system of claim 7, comprising a power supply cable, wherein the plasma cutting power supply comprises a power supply port, and the power supply cable is configured to removably couple with the power supply port of the plasma cutting power supply.

11. The system of claim 7, wherein the torch connector comprises a quick disconnect system.

12. A method of manufacturing a plasma cutting power supply, comprising:
providing a plasma cutting power supply having a panel on a side of the plasma cutting power supply; and
providing a work lead port in the panel, wherein the work lead port is configured to removably receive a quick disconnect connector of a work lead assembly such that the quick disconnect connector is readily detachable from the work lead port without the use of tools, wherein the quick disconnect connector comprises a dinse style connector or a twist lock style connector.

13. The method of claim 12, comprising:
providing a gas port in the panel, wherein the gas port is configured to removably couple with a torch assembly and to supply gas to the torch assembly; and
providing an electrical port in the panel, wherein the electrical port is configured to removably couple with the torch assembly and to supply power to the torch assembly.

14. The method of claim 13, comprising removably securing the torch assembly to the gas port and the electrical port.

15. The method of claim 12, comprising removably securing the quick disconnect connector of the work lead assembly to the work lead port.

16. The method of claim 12, comprising providing a primary power supply cable that is configured to removably couple with a power supply port of the plasma cutting power supply.

17. The method of claim 12, wherein the quick disconnect connector of the work lead port comprises the dinse style connector.

18. The method of claim 12, wherein the quick disconnect connector of the work lead port comprises the twist lock style connector.

\* \* \* \* \*